United States Patent
Kauffer et al.

(10) Patent No.: US 10,465,092 B2
(45) Date of Patent: Nov. 5, 2019

(54) RADIATION-CURABLE COATING COMPOSITION, METHOD FOR PRODUCING SCRATCH-RESISTANT COATINGS, USE OF THE COATING COMPOSITION, AND SUBSTRATE COATED WITH A COATING COMPOSITION

(71) Applicant: BASF Coatings GmbH, Muenster (DE)

(72) Inventors: Isabelle Kauffer, Muenster (DE); Guenter Klein, Muenster (DE); Peter Mayenfels, Muenster (DE); Ulrike Wenking, Muenster (DE); Thomas Leitner, Muenster (DE)

(73) Assignee: BASF Coatings GmbH, Muenster (DE)

( * ) Notice: Subject to any disclaimer, the term of this patent is extended or adjusted under 35 U.S.C. 154(b) by 0 days.

(21) Appl. No.: 16/071,562

(22) PCT Filed: Jan. 16, 2017

(86) PCT No.: PCT/EP2017/050772
§ 371 (c)(1),
(2) Date: Jul. 20, 2018

(87) PCT Pub. No.: WO2017/125339
PCT Pub. Date: Jul. 27, 2017

(65) Prior Publication Data
US 2019/0016919 A1    Jan. 17, 2019

(30) Foreign Application Priority Data
Jan. 21, 2016 (EP) ..................... 16152256

(51) Int. Cl.
| | | |
|---|---|---|
| *C09D 175/16* | (2006.01) | |
| *C08F 222/10* | (2006.01) | |
| *C08F 220/20* | (2006.01) | |
| *C09D 4/00* | (2006.01) | |
| *C09D 5/00* | (2006.01) | |
| *C08J 7/04* | (2006.01) | |
| *C08J 7/18* | (2006.01) | |
| *C08F 2/44* | (2006.01) | |
| *C08F 2/48* | (2006.01) | |
| *C08G 18/67* | (2006.01) | |
| *C08G 18/79* | (2006.01) | |
| *C08G 18/81* | (2006.01) | |
| *C08G 18/08* | (2006.01) | |
| *C08G 18/68* | (2006.01) | |
| *C08G 18/69* | (2006.01) | |
| *C08G 18/80* | (2006.01) | |
| *C08F 283/00* | (2006.01) | |
| *C09D 151/08* | (2006.01) | |
| *C08F 220/34* | (2006.01) | |

(52) U.S. Cl.
CPC .............. *C09D 175/16* (2013.01); *C08F 2/44* (2013.01); *C08F 2/48* (2013.01); *C08F 220/20* (2013.01); *C08F 222/1006* (2013.01); *C08F 283/006* (2013.01); *C08G 18/0842* (2013.01); *C08G 18/672* (2013.01); *C08G 18/68* (2013.01); *C08G 18/694* (2013.01); *C08G 18/792* (2013.01); *C08G 18/8003* (2013.01); *C08G 18/8175* (2013.01); *C08J 7/047* (2013.01); *C08J 7/18* (2013.01); *C09D 4/00* (2013.01); *C09D 5/00* (2013.01); *C09D 151/08* (2013.01); *C08F 2220/343* (2013.01); *C08F 2222/1013* (2013.01); *C08G 2150/00* (2013.01); *C08J 2369/00* (2013.01); *C08J 2475/16* (2013.01)

(58) Field of Classification Search
CPC .. C08G 18/672; C08G 18/792; C08G 18/694; C08G 18/8175; C08G 18/0842; C08G 18/68; C08G 18/8003; C08G 2150/00; C09D 151/08; C09D 4/00; C09D 5/00; C09D 175/16; C08F 283/006; C08F 2/44; C08F 2/48; C08F 220/20; C08F 222/1006; C08F 2222/1013; C08F 2220/343; C08J 7/047; C08J 7/18; C08J 2475/16; C08J 2369/00
USPC ........................................................ 524/8
See application file for complete search history.

(56) References Cited

U.S. PATENT DOCUMENTS

| | | |
|---|---|---|
| 5,442,090 A | 8/1995 | Beck et al. |
| 6,414,100 B1 | 7/2002 | Daimon et al. |
| 10,005,923 B2 | 6/2018 | Klein et al. |
| 2013/0202892 A1 | 8/2013 | Kues et al. |

FOREIGN PATENT DOCUMENTS

| | | |
|---|---|---|
| DE | 696 15 819 T2 | 6/2002 |
| DE | 10 2010 006 755 A1 | 8/2011 |

(Continued)

OTHER PUBLICATIONS

Database WPI, Week 201408, Thomson Scientific, London, GB; AN 2012-L97910 XP002759053, 2012, 2 pages.

(Continued)

*Primary Examiner* — Angela C Scott
(74) *Attorney, Agent, or Firm* — Oblon, McClelland, Maier & Neustadt, L.L.P.

(57) ABSTRACT

The present invention relates to a radiation-curable coating composition, especially for producing a scratch-resistant coating on polycarbonate surfaces, comprising at least one urethane acrylate of an isocyanurate trimer of 1,6-hexamethylene diisocyanate and butanediol monoacrylate. The invention also relates to a method for producing scratch-resistant coatings on polycarbonate surfaces, to the use of the coating composition, and to a substrate coated accordingly.

15 Claims, No Drawings

(56) References Cited

FOREIGN PATENT DOCUMENTS

EP          1 055 669 A1    11/2000
KR    10-2012-0097818         9/2012

OTHER PUBLICATIONS

European Search Report for EP Patent Application No. 16152256.0, dated Jul. 18, 2016, 3 pages.
International Search Report and Written Opinion dated Mar. 20, 2017 in PCT Patent Application No. PCT/EP2017/05077.
U.S. Appl. No. 15/526,843, filed May 15, 2017, Guenter Klein.
International Search Report dated Mar. 20, 2017 in PCT/EP2017/050772 filed Jan. 16, 2017.

and their the tent of 19.6 to 24.0 wt % and an equivalent weight of 175 to 214, the urethane acrylate having a weight ratio of the

RADIATION-CURABLE COATING COMPOSITION, METHOD FOR PRODUCING SCRATCH-RESISTANT COATINGS, USE OF THE COATING COMPOSITION, AND SUBSTRATE COATED WITH A COATING COMPOSITION

The present invention relates to a radiation-curable coating composition, especially for producing a scratch-resistant coating on polycarbonate surfaces, comprising at least one urethane acrylate of an isocyanurate trimer of 1,6-hexamethylene diisocyanate and butanediol monoacrylate. The invention also relates to a method for producing scratch-resistant coatings on polycarbonate surfaces, to the use of the coating composition, and to a substrate coated accordingly.

It is known that the glasses or lenses of vehicle headlamps are required to exhibit optimum optical yield, high transparency, easy formability, allowing them to be brought into any desired shape, high robustness (strength), and a suitable weight. Not all of these properties can be obtained with the traditional glasses or lenses made from real glass. The current trend is to replace the glass lenses by lenses made from polymeric materials, which are lighter and can be shaped more easily. One material considered optimum from this standpoint is polycarbonate, which also has optical properties which are a match or a near match for those of actual glass.

It is nevertheless known that polycarbonate is a particularly soft material and therefore liable to scratches, leading to a deterioration in the optical properties of the lens (the glass). Moreover, prolonged exposure to sunlight or to environmental influences and/or to chemical agents may result in aging, causing the lens (the glass) to become brittle and in particular to suffer yellowing and hence a loss of transparency.

In order to solve these problems, the lenses or glasses for headlamps that are produced from polycarbonate (or other similar polymeric materials) must be protected, at least on their outer surface exposed to the environment in service, through application of special transparent varnishes.

A radiation-curable coating composition of the type specified at the outset is known from DE 696 15 819 T2. Although the known coating composition affords good protection to plastic lenses or glasses for vehicle headlamps to counter scratches and weathering effects, there is nevertheless a need for this step to be further improved. The known coating composition, moreover, has the disadvantage that it must be applied at high film thickness in order to afford adequate protection. Hence the dry film thickness of the varnish coats produced with the known coating composition is at least 20 μm, and preferably in fact at least 25 μm. Such film thicknesses result in high levels of consumption of material, and are no longer in tune with the times.

It is an object of the present invention to specify a radiation-curable coating composition which is suitable particularly for the coating of polycarbonate surfaces and which leads to cured varnish coats featuring improved scratch resistance and improved weathering stability for a reduced dry film thickness.

This object is achieved in accordance with the invention by a radiation-curable coating composition comprising at least one urethane acrylate prepared from an isocyanurate trimer of 1,6-hexamethylene diisocyanate and butanediol monoacrylate, the isocyanurate trimer having an NCO content of 19.6 to 24.0 wt % and an equivalent weight of 175 to 214, the urethane acrylate having a weight ratio of the isocyanurate trimer to the butanediol monoacrylate of 1.0:0.65 to 1.0:0.9, wherein the coating composition comprises i) 45.0 to 59.0 wt % of the at least one urethane acrylate,
ii) 25.0 to 37.0 wt % of at least one tetrafunctional polyester acrylate monomer,
iii) 8.0 to 12.0 wt % of at least one diol diacrylate ester and/or of at least one monoacrylate ester,
iv) 2.3 to 3.5 wt % of at least one photoinitiator,
v) 2.1 to 3.1 wt % of at least one reactive acryloyltriazole UV absorber,
vi) 1.5 to 2.0 wt % of at least one nonreactive UV absorber,
vii) 0.7 to 1.0 wt % of at least one sterically hindered amine, and
viii) 0.4 to 0.9 wt % of at least one flow control additive, the weight percentage ranges being based on the sum of the solids contents of the stated components i) to viii) and their sum making 100 wt %.

Advantageous refinements of the radiation-curable coating composition of the invention are apparent from the dependent claims.

The solids content is the nonvolatile proportion of a substance or composition. The solids content is determined according to DIN EN ISO 3251:2008, by drying 3 g of the substance or composition at 60° C. for 60 minutes. The nonvolatile proportion which remains after drying is set in relation to the initial mass, and gives the solids content of the substance or composition.

The isocyanate group content is determined in accordance with DIN EN ISO 11909.

Unless indicated otherwise herein, all statements of standards relate to the standard in force at the filing date of the present invention.

The radiation-curable coating composition is preferably a coating composition which is cured by UV radiation. UV curing denotes a chemical reaction induced by UV rays. UV radiation is the term for that component of electromagnetic radiation that encompasses the wavelength range from 100 to 400 nm.

With further preference the coating composition of the invention is a clearcoat material.

Urethane Acrylate

Urethane acrylates can generally be prepared by the addition reaction of hydroxyalkyl acrylates, diisocyanates, and polyols or by the direct addition reaction of hydroxyalkyl acrylates onto polyisocyanates. They allow the high performance level and the multiplicity of possible applications of polyurethane coatings to be combined with the curing speed and the efficiency of photopolymerization. Urethane acrylates are used in radiation-curing coatings for industrial applications.

The coating composition of the invention comprises at least one urethane acrylate prepared from an isocyanurate trimer of 1,6-hexamethylene diisocyanate and butanediol monoacrylate, the isocyanurate trimer having an NCO content of 19.6 to 24.0 wt % and an equivalent weight of 175 to 214, the urethane acrylate having a weight ratio of the isocyanurate trimer to the butanediol monoacrylate of 1:0.65 to 1:0.9.

DE 696 15 819 T2 uses, in the coating composition, a base resin prepared from an isocyanurate trimer of 1,6-hexamethylene diisocyanate and butanediol monoacrylate. The isocyanate compound used has an NCO content of 11.0 wt % and an equivalent weight of 382. In the context of the present invention it has been found that the scratch resistance and the weathering stability of the resultant cured coating films can be improved by a polyisocyanate having a higher NCO content and a lower equivalent weight and by a modified composition of polymerizable monomers and UV absorbers.

It is essential to the invention that the coating composition comprises 45.0 to 59.0 wt % of the urethane acrylate prepared from an isocyanurate trimer of 1,6-hexamethylene diisocyanate and butanediol monoacrylate, based on the sum of the solids contents of the stated components i) to viii). The coating composition preferably comprises 45.0 to 55.0 wt % of the urethane acrylate in question. If the weight percentage fraction of the urethane acrylate is below the limit specified above, the result is an impaired reactivity of the components on curing of the coating composition. If the weight percentage fraction of the urethane acrylate is above 59.0 wt %, based on the sum of the solids contents of the stated components i) to viii), the result is an impaired adhesion of the coating resulting from the coating composition to the substrate to which the coating composition has been applied.

Tetrafunctional Polyester Acrylate Monomer

The coating composition of the invention comprises 25.0 to 37.0 wt % of at least one tetrafunctional polyester acrylate monomer, based on the sum of the solids contents of components i) to viii). The coating composition preferably comprises 27.0 to 37.0 wt % of at least one tetrafunctional polyester acrylate monomer, based on the sum of the solids contents of components i) to viii).

Where the weight percentage fraction of the tetrafunctional polyester acrylate monomer is below the limit set out above, the result is impaired adhesion of the coating produced from the coating composition to the substrate to which the coating composition has been applied. Where the weight percentage fraction of the tetrafunctional polyester acrylate monomer is above the weight percentage limits set out above, the result is impaired scratch resistance on the part of the resultant coating.

In relation to component ii) it is essential to the invention that it comprises four acrylic acid building blocks, therefore being tetrafunctional in respect of the acrylic acid building blocks.

The tetrafunctional polyester acrylate monomer preferably has, as a further structural element, oxygen atoms in the form of ether bonds. More preferably the tetrafunctional polyester acrylate monomer has exactly one ether bond. The particularly preferred presence of an ether bond provides for improved chemical resistance on the part of the coating produced from the coating composition. Very preferably the tetrafunctional polyester acrylate monomer is di(trimethylolpropane) tetraacrylate.

Diol Diacrylate Ester/Monoacrylate Ester

In accordance with the invention the radiation-curable coating composition comprises as component iii) 8.0 to 12.0 wt % of at least one diol diacrylate ester and/or at least one monoacrylate ester. More preferably the coating composition comprises 9.0 to 10.0 wt % of at least one diol diacrylate ester and/or of at least one monoacrylate ester, based on the sum of the solids contents of components i) to viii). Accordingly, within the weight percentage ranges stated above, the coating composition comprises either at least one diol diacrylate ester or at least one monoacrylate ester, or a mixture of at least one diol diacrylate ester and at least one monoacrylate ester; the use of diol diacrylate esters is preferred.

Monoacrylate esters used are preferably trimethylolpropane formal acrylate, butanediol monoacrylate (4-HBA), tetrahydrofurfuryl acrylate (THFA), octyldecyl acrylate (ODA), or isodecyl acrylate (IDA). Particular preference is given to using butanediol monoacrylate (4-HBA), tetrahydrofurfuryl acrylate (THFA), octyldecyl acrylate (ODA), or isodecyl acrylate (IDA).

Diol diacrylate esters used are preferably compounds having 2 to 12 carbon atoms in the longest carbon chain. One particularly preferred diol diacrylate ester is 1,6-hexanediol diacrylate.

The use of the weight percentage amount of diol diacrylate esters and/or monoacrylate esters in the coating composition of the invention controls the partial swelling of the substrate, more particularly of the polycarbonate, to which the coating composition is applied, allowing what is called an IPL layer (interpenetration layer) to form. This ensures the adhesion of the coating on the substrate. The formation of this "IPL" layer is achieved through the partial dissolution of the topmost layer of the polycarbonate substrate. The partial dissolution must not, however, be enough to detract from the transparency of the coated polycarbonate substrate and to be manifested accordingly in the appearance of a severe haze. This "partial swelling" causes improved adhesion through an enlargement of the contact areas between the substrate and the coating composition. Additionally, the partial swelling must not be excessive, since excessive swelling leads to impaired weathering stability. If the partial swelling is too low, on the other hand, the result is impaired adhesion to the substrate.

Photoinitiator

The coating composition of the invention comprises 2.3 to 3.5 wt % of at least one photoinitiator, based on the sum of the solids contents of components i) to viii).

Photoinitiators are used to start off the crosslinking reaction on exposure to radiation.

The at least one photoinitiator advantageously comprises a phosphorus-containing compound. Corresponding trade products are available commercially under the Irgacure name. With particular advantage the photoinitiator comprises a mixture of at least one phosphorus-containing compound and at least one aromatic α-hydroxy ketone.

The preferred use of two different photoinitiators is beneficial to the through-curing of the coating composition, allowing through-curing to be achieved both at the surface of the coating composition and in the vicinity of the substrate surface.

Light Stabilizers

The coating composition of the invention comprises various light stabilizers, comprising a combination of at least two UV absorbers and at least one sterically hindered amine as radical scavenger. The function of the light stabilizer is to prevent the formation of chemically reactive intermediate components that can lead to decomposition of the crosslinked coating film. The free radicals within a coating that form as a result of the scission of chemical bonds, brought about by harmful UV radiation from the surroundings, are to be captured and deactivated in this way. The radicals that form as a result of the scission of a chemical bond lead to a chain reaction within a coating, resulting in further bond scissions. Accordingly, the use of a light stabilizer is essential to the invention in order to ensure effective weathering stability over the long term for the coating produced from the coating composition of the invention.

UV Absorbers

The coating composition of the invention comprises the combination of a reactive acryloyltriazole UV absorber and of a nonreactive UV absorber. "Reactive" here means that the UV absorber on radiation curing reacts with the other radiation-curable constituents and is incorporated by copolymerization. In contrast, the nonreactive UV absorber does not react with other constituents of the coating composition.

The coating composition of the invention comprises 2.1 to 3.1 wt % of at least one reactive acryloyltriazole UV absorber and 1.5 to 2.0 wt % of at least one nonreactive UV absorber, based in each case on the sum of the solids contents of components i) to viii).

The reactive acryloyltriazole UV absorber is advantageously an acryloylphenylbenzotriazole. This absorber, as a result of the acrylate functionality in the molecule, is incorporated chemically into the resultant coating during the crosslinking reaction, and therefore fixed, thus preventing migration. Commercial products are available under the tradename Chisorb 593 from Double Bond Chemical.

The nonreactive UV absorber is advantageously a compound based on a 1,3,5-triazine. Commercial products are available under the tradename Tinuvin400 from BASF SE (formerly from Ciba).

The inventive use of a combination of at least one reactive acryloyltriazole UV absorber and of at least one nonreactive UV absorber ensures that in the coating produced from the coating composition of the invention, radiation from the environment is converted into corresponding rotational and vibrational energy of these molecules, thereby avoiding damage to chemical bonds within a coating and hence allowing the scission of bonds to be prevented.

Radical Scavenger—Sterically Hindered Amine

The coating composition of the invention comprises 0.7 to 1.0 wt % of at least one sterically hindered amine, based on the sum of the solids contents of components i) to viii), acting as a radical scavenger.

As light stabilizer based on sterically hindered amines, there is advantage in using a diester of sebacic acid. Appropriate commercial products are available under the tradename Tinuvin123 from BASF SE (formerly from Ciba).

Flow Control Additives

The coating composition of the invention comprises 0.4 to 0.9 wt % of at least one flow control additive, based on the sum of the solids contents of components i) to viii).

Employed as a flow control additive in the coating composition of the invention is, preferably, a polysiloxane modified polymer with unsaturated end groups. Appropriate commercial products are available under the EFKA product line from BASF.

The flow control additive is responsible for the attainment of effective topcoat holdout and also of good appearance on the part of the coating produced from the coating composition of the invention, especially when the coating composition of the invention is used as clearcoat material. Generally speaking, clearcoat materials at sufficiently high film thickness, generally >25 µm, exhibit good leveling, which generally deteriorates at reduced film thicknesses. Since the coating composition of the invention is applied preferably with low film thicknesses in the range from 8 to 25 µm, the use of a suitable flow control additive in the range from 0.4 to 0.9 wt % of at least one flow control additive, based on the sum of the solids contents of components i) to viii), is essential to the invention. If the above-stated weight percentage range is exceeded, there is impaired scratch resistance on the part of the coating produced from the coating composition.

Solvents

The coating composition of the invention is adjusted to the desired application viscosity preferably through the use of organic solvents. The coating composition advantageously comprises 27.0 to 70.0 wt % of organic solvent, based on the total weight of the coating composition.

Organic solvents contemplated are advantageously all customary organic solvents known to the skilled person that on the one hand permit good solubility of the components and on the other hand are known to achieve good storage stability and to permit good application behavior by the coating composition. Suitable for this purpose are, in particular, alcohols, such as isopropanol and n-butanol, esters, such as n-butyl acetate and 1-hydroxypropyl acetate, and/or ketones, such as methyl ethyl ketone and methyl isobutyl ketone. In selecting the solvents or the solvent combination, care should be taken to ensure that they are so chosen as not to cause the polycarbonate substrate, on application of the coating composition, to undergo partial swelling to such an extent that the transparency of the substrate is adversely affected after the curing of the coating composition, as manifested in increased haze. Through the choice of the solvents, it is also possible to influence the adhesion of the coating resulting from the coating composition to the substrate. It should be ensured, however, that the solvents are so chosen as to achieve a good attachment effect through the partial swelling of the substrate, but without causing dulling of the cured coating composition.

As a result of the variable weight percentage adjustment of the solvent fraction relative to the total weight of the coating composition, the solids content of the coating composition can be advantageously varied such that the coating composition of the invention can be applied either as a flow coating or as a spray coating to the substrate. For application in the flow coating sector, an advantageous solids content is from 27.0 to 50.0 wt %, based on the total weight of the coating composition. Within the spray coating sector, an advantageous solids content is from 60.0 to 70.0 wt %, based on the total weight of the coating composition. Generally speaking, however, higher solids contents than those stated above, relative to the total weight of the coating composition, can be realized for the coating composition of the invention. In these cases, though, it must be ensured that the reduced solvent fraction relative to the total weight of the coating composition does not produce disadvantages in terms of topcoat holdout and of leveling.

The invention also relates to a method for producing scratch-resistant coatings on polycarbonate surfaces by i) applying a coating composition of the invention to a polycarbonate surface and ii) curing the coating composition with UV radiation.

The scratch-resistant coating is applied advantageously with dry film thicknesses of 8 to 25 µm, more preferably with dry film thicknesses of 10 to 20 µm. The dry film thickness of a clearcoat is determined using a white light interferometer. The dry film thickness of a coating which is not a clearcoat is determined by producing a ground section and then subjecting such sections to microscope study.

The invention further relates to the use of a coating composition of the invention for producing a coating to protect surfaces of vehicle headlamps against scratches and effects of weathering.

Lastly, the invention also relates to a substrate coated with a cured coating composition of the invention. The substrate in question is preferably a polycarbonate substrate.

In the text below, the invention is illustrated in more detail, using working examples and comparative examples.

PREPARATION EXAMPLE 1: PREPARATION OF URETHANE ACRYLATE 1 BY DE 696 15 819 T2 (COMPARATIVE)

The base resin is prepared by mixing together the following components in the stated proportions (expressed in grams):

| DESMODUR 2010 (BAYER) | 44.7 |
|---|---|
| Butanediol monoacrylate | 15.3 |
| TMP formal (LAROMER 8887) | 38.4 |
| Dibutyltin dilaurate | 0.152 |
| Ethyl acetate | 1.368 |

PREPARATION EXAMPLE 2: PREPARATION OF URETHANE ACRYLATE 2 (INVENTIVE)

A 1000 ml three-neck flask is charged with 170.70 g of the isocyanate trimer (Desmodur N3300, from Bayer). The apparatus is fitted with a KPG blade stirrer, a dropping funnel, and a gas supply section for the introduction of lean air.

The isocyanate is diluted with 83.05 g of the reactive diluents di-TMP tetraacrylate (Ebecryl 140 from Allnex). Additionally, the initial charge is stabilized with 0.4 g of hydroquinone (from MitsuiChemicals) and then the solution is heated to 40° C.

As soon as the reaction temperature is reached, a mixture of 133.75 g of butanediol monoacrylate (from BASF SE), 0.05 g of Coscat 83 (from Erbslöh), 49.25 g of hexanediol diacrylate (Laromer HDDA from BASF SE), 61.05 g of di-TMP-tetraacrylate (Ebecryl 140 from Allnex), and 1.75 g of methoxypropanol (Solvenon PM from BASF SE) is added dropwise. During the addition time (approximately 4 hours), the reaction temperature of 60° C. must not be exceeded.

After the end of the addition, the reaction mixture is held at 60° C. and the NCO content is determined hourly. When the NCO content of 0% is reached, the product mixture is cooled to 50° C. and filtered.

Coscat 83 is an organobismuth compound, which is used as a catalyst for the formation of urethane.

Using the two urethane acrylates described above, radiation-curable coating compositions were produced. The raw materials used were as follows:

| | |
|---|---|
| HOSTAVIN TB-02 | Mixture of a triazine UV absorber with an acylated light stabilizer based on a sterically hindered amine |
| Irgacure TPO-L | Photoinitiator Ethylphenyl (2,4,6-trimethylbenzoyl)phosphinate |
| Irgacure 184 | Photoinitiator (1-hydroxy-cyclohexyl phenyl ketone) |
| Irgacure 819 | Photoinitiator (bis(2,4,6-trimethylbenzoyl)phenylphosphine oxide) |
| EFKA-3883 | Flow control additive (polysiloxane-modified polymer) |
| EFKA-3888 | Flow control additive (polysiloxane-modified polyisocyanate) |
| SARBOX SB400 | Film-forming additive (methacrylate oligomer containing carboxylic acid and carboxylic anhydride) |
| CHISORB 593 | UV absorber (2-(2'-hydroxy-5'-methacryloyloxyethylphenyl)-2H-benzotriazole) |
| TINUVIN 400 | UV absorber (hydroxyphenyltriazine) |
| TINUVIN 123 (Bis(octyloxy-tetramethylpiperidyl) sebacate) | Sterically hindered amine (HALS) based on an amino ether functionality (NOR-HALS) |

In accordance with table 1 below, inventive and noninventive coating compositions were produced. The numerical figures in table 1 denote parts by weight.

TABLE 1

| | Coating material # | | | | | |
|---|---|---|---|---|---|---|
| | 1 | 2 | 3 | 4 | 5 | 6 |
| Urethane acrylate 1 | 65.789 | | | 64.641 | 65.789 | |
| Urethane acrylate 1 without Laromer 8887 | | | | | | |
| Urethane acrylate 2 | | 65.789 | | | | 63.842 |
| Urethane acrylate 2 without Ebecryl 140 and without hexanediol diacrylate; with Laromer 8887 | | | 39.474 | | | |
| TRIMETHYLOLPROPANE FORMAL ACRYLATE, commercial product: Laromer 8887 | | | 26.316 | | | |
| DI-TMP TETRAACRYLATE | | | | | | |
| HEXANEDIOL DIACRYLATE | | | | | | |
| HOSTAVIN TB-02 LIQUID | 1.754 | 1.754 | 1.754 | | 1.754 | |
| ORTHO-METHYL BENZOYLFORMATE, commercial product: Vicure 55 (photoinitiator) | 1.140 | 1.140 | 1.140 | 1.120 | 1.140 | |
| Irgacure TPO-L | 0.614 | 0.614 | 0.614 | 0.603 | 0.614 | |
| IRGACURE 184 | | | | | | 1.596 |
| IRGACURE 819, 100% | | | | | | 0.511 |
| EFKA-3883, 70% BA/IB | 0.877 | 0.877 | 0.877 | 0.862 | 0.877 | 0.758 |
| EFKA-3888, 44% BA | 0.877 | 0.877 | 0.877 | 0.862 | 0.877 | |
| SARBOX SB 400, 70% PM | 2.632 | 2.632 | 2.632 | 2.586 | 2.632 | |
| METHYLAL, TECHN. | 26.316 | 26.316 | 26.316 | 25.856 | | 29.846 |
| CHISORB 593 | | | | 1.724 | | 1.724 |
| TINUVIN 400 | | | | 1.164 | | 1.149 |
| TINUVIN 123 | | | | 0.582 | | 0.575 |
| BUTYL ACETATE 98-100% | | | | | 26.316 | |
| | 100.00 | 100.00 | 100.00 | 100.00 | 100.00 | 100.00 |

| | Coating material # | | | | | |
|---|---|---|---|---|---|---|
| | 7 | 8 | 9 | 10 | 11 | 12 |
| Urethane acrylate 1 | | | 67.568 | 63.842 | | |
| Urethane acrylate 1 without Laromer 8887 | | | | | | 39.474 |

TABLE 1-continued

| | | | | | | |
|---|---|---|---|---|---|---|
| Urethane acrylate 2 | 63.842 | | | 64.975 | 62.252 | |
| Urethane acrylate 2 without Ebecryl 140 and without hexanediol diacrylate; with Laromer 8887 | | | | | | |
| TRIMETHYLOLPROPANE FORMAL ACRYLATE, commercial product: Laromer 8887 | | | | | | |
| DI-TMP TETRAACRYLATE | | | | | | 19.737 |
| HEXANEDIOL DIACRYLATE | | | | | | 6.579 |
| HOSTAVIN TB-02 LIQUID | | 1.802 | | 1.733 | | 1.754 |
| ORTHO-METHYL BENZOYLFORMATE, commercial product: Vicure 55 (photoinitiator) | | 1.171 | | | | 1.140 |
| Irgacure TPO-L | | 0.631 | | | | 0.614 |
| IRGACURE 184 | 1.596 | | 1.596 | 1.624 | 1.556 | |
| IRGACURE 819, 100% | 0.511 | | 0.511 | 0.520 | 0.498 | |
| EFKA-3883, 70% BA/IB | 0.758 | 0.901 | 0.758 | 0.772 | 0.739 | 0.877 |
| EFKA-3888, 44% BA | | 0.901 | | | | 0.877 |
| SARBOX SB 400, 70% PM | | | | | 2.490 | 2.632 |
| METHYLAL, TECHN. | | 27.027 | | | | 26.316 |
| CHISORB 593 | 1.724 | | 1.724 | | 1.681 | |
| TINUVIN 400 | 1.149 | | 1.149 | | 1.121 | |
| TINUVIN 123 | 0.575 | | 0.575 | | 0.560 | |
| BUTYL ACETATE 98-100% | 29.846 | | 29.846 | 30.376 | 29.109 | |
| | 100.00 | 100.00 | 100.00 | 100.00 | 100.00 | 100.00 |

Coating compositions 1 to 12 were applied and cured as follows:

Spray application took place using a gravity-fed cup gun (e.g., DeVilbiss GTI gravity spray gun) spraying with 3 bar compressed air through a 1.5 mm nozzle. The required film thickness was applied in 2 spray passes. Flash-off: 1 minute at 23° C., 5 minutes 80-90° C. in forced air oven, then 30 seconds cooling.

Curing with UV radiation: 2.5-3.5 J/cm$^2$ (dose measured with IL390 from International Light).

The film thickness achieved for the coating produced from the coating composition (dry film thickness) was 11-18 μm; the "IPL" (interpenetration layer) thickness was 3-5 μm.

Measurements of film/layer thickness were made using a white light interferometer (e.g., from Fuchs, with the designation "FTM-Lite UV/NIR film thickness gauge"). The haze determined following application of the samples is to be <1%.

The haze was measured using the BYK-Gardner "Haze-Gard Plus" instrument. This instrument is a standardized instrument for the measurement of transparency in accordance with ASTM standard D1003-13. The instrument is used to determine the optical quality of transparent coatings.

Using this instrument, the initial haze and also the haze after implementation of scratching tests (the Taber Abraser test) are measured.

The scratch resistance of the cured coating films was tested as follows:

The scratch resistance test took place using the 5155 Abraser device from Taber Industries. The scratch tests were conducted, and testing carried out, in accordance with the ASTM standard ASTM D1044-13 (Standard Test Method for Resistance of Transparent Plastics to Surface Abrasion, Standard by ASTM International, Sep. 1, 2013). Evaluation took place in accordance with the ASTM standard ASTM D1003-13 (Standard Test Method for Haze and Luminous Transmittance of Transparent Plastics).

Scratch resistance values ascertained were as follows:

TABLE 2

| | Taber abraser (ASTM D 1044) | | | | | |
|---|---|---|---|---|---|---|
| | 1 | 2 | 3 | 4 | 5 | 6 |
| Film thickness in μm | 14-16 | 14-15 | 14-16 | 13-14 | 15-16 | 13-14 |
| Haze before test (%) | 0.53 ± 0.16 | 0.27 ± 0.00 | 0.29 ± 0.06 | 1.56 ± 0.16 | 0.49 ± 0.05 | 0.45 ± 0.06 |
| Refacing stone ST-11, CS 10F, 300T | 20.3 ± 0.46 | 8.91 ± 0.16 | 16.4 ± 0.82 | 24.1 ± 2.57 | 19.2 ± 1.32 | 12.2 ± 0.88 |
| Δ haze | 19.8 | 8.64 | 16.1 | 22.5 | 18.7 | 11.7 |

| | Taber abraser (ASTM D 1044) | | | | | |
|---|---|---|---|---|---|---|
| | 7 | 8 | 9 | 10 | 11 | 12 |
| Film thickness in μm | 14-16 | 14-16 | 14-16 | 14-16 | 15-16 | 15-17 |
| Haze before test (%) | 0.31 ± 0.04 | 0.45 ± 0.08 | 2.94 ± 0.36 | 0.39 ± 0.04 | 0.31 ± 0.09 | 0.56 ± 0.03 |
| Refacing stone ST-11, CS 10F, 300T | 13.3 ± 0.39 | 18.1 ± 0.70 | 20.7 ± 1.21 | 12.6 ± 0.37 | 13.6 ± 0.71 | 35.3 ± 2.50 |
| Δ haze | 13.0 | 17.7 | 17.8 | 12.2 | 13.3 | 34.7 |

Evaluation

Scratch resistance for the coatings on polycarbonate lamp housings is good when they exhibit a Δ haze of ≤15 (after 300 revolutions in the Taber Abraser test) when the Taber Abraser test is conducted.

Highly scratch-resistant systems are those exhibiting a Δ haze of below 10 (after 300 revolutions in the Taber Abraser test).

What is claimed is:

1. A radiation-curable coating composition, comprising:
   i) 45.0 to 59.0 wt % of a urethane acrylate prepared from an isocyanurate trimer of 1,6-hexamethylene diisocyanate and butanediol monoacrylate, wherein the isocyanurate trimer has an NCO content in a range of 19.6 to 24.0 wt % and an equivalent weight of 175 to 214, and the urethane acrylate has a weight ratio of the isocyanurate trimer to the butanediol monoacrylate in a range of 1.0:0.65 to 1.0:0.9;
   ii) 25.0 to 37.0 wt % of a tetrafunctional polyester acrylate monomer;
   iii) 8.0 to 12.0 wt % of a component A selected from the group consisting of a diol diacrylate ester, a monoacrylate ester, and mixtures thereof;
   iv) 2.3 to 3.5 wt % of a photoinitiator;
   v) 2.1 to 3.1 wt % of a reactive acryloyltriazole UV absorber;
   vi) 1.5 to 2.0 wt % of a nonreactive UV absorber;
   vii) 0.7 to 1.0 wt % of a sterically hindered amine;
   viii) 0.4 to 0.9 wt % of a flow control additive;
   where the weight percentage ranges are based on a sum of the solid content of components i) to viii), their sum making 100 wt %.

2. The coating composition of claim 1, which comprises 45.0 to 55.0 wt % of the urethane acrylate, based on a sum of the solids contents of components i) to viii).

3. The coating composition of claim 1, wherein the tetrafunctional polyester acrylate monomer has an ether bond.

4. The coating composition of claim 1, wherein component iii) is a diol diacrylate ester.

5. The coating composition of claim 1, wherein the component iii) is a diol diacrylate ester having 2 to 12 carbon atoms in the longest carbon chain.

6. The coating composition of claim 1, wherein the photoinitiator comprises a phosphorus-containing compound.

7. The coating composition of claim 1, wherein the photoinitiator comprises a mixture of a phosphorus-containing compound and an aromatic α-hydroxy ketone.

8. The coating composition of claim 1, wherein the reactive acryloyltriazole UV absorber is an acryloylphenolbenzotriazole.

9. The coating composition of claim 1, wherein the sterically hindered amine is a diester of sebacic acid.

10. The coating composition of claim 1, which is curable with UV radiation.

11. The coating composition of claim 1, which is a clearcoat material.

12. A method for producing a scratch-resistant coating on a polycarbonate surface, the method comprising:
   i) applying the coating composition of claim 1 to a polycarbonate surface, and
   ii) curing the coating composition with UV radiation.

13. The method of claim 12, wherein the scratch-resistant coating has a dry film thickness in a range of 8 to 25 μm.

14. A method for protecting a vehicle headlamp from scratches, effects of weathering, or both scratches and effects of weathering, the method comprising:
   i) coating the vehicle headlamp with the coating composition of claim 1.

15. An article comprising a substrate, wherein the substrate is coated with the coating composition of claim 1, and wherein the coating composition is cured.

* * * * *